(12) United States Patent
McClure et al.

(10) Patent No.: US 7,083,721 B2
(45) Date of Patent: Aug. 1, 2006

(54) STORMDRAIN CURB-INLET MULTI-STAGE FILTRATION-UNIT

(76) Inventors: Stewart D. McClure, 2259 Lone Oak La., Vista, CA (US) 92084; Ivan R. Fox, 2259 Lone Oak La., Vista, CA (US) 92084

( * ) Notice: Subject to any disclaimer, the term of this patent is extended or adjusted under 35 U.S.C. 154(b) by 0 days.

(21) Appl. No.: 10/435,623

(22) Filed: May 12, 2003

(65) Prior Publication Data

US 2004/0226869 A1 Nov. 18, 2004

(51) Int. Cl.
*E03F 5/14* (2006.01)

(52) U.S. Cl. .................. 210/155; 210/162; 210/163; 210/305; 210/521; 210/532.1

(58) Field of Classification Search ............... 210/155, 210/162, 163, 164, 170, 254, 299, 305, 532.1, 210/521, 242.4
See application file for complete search history.

(56) References Cited

U.S. PATENT DOCUMENTS

| | | | | |
|---|---|---|---|---|
| 783,556 | A * | 2/1905 | Van Buskirk | 210/163 |
| 1,507,531 | A * | 9/1924 | Vaudell | 210/164 |
| 1,654,247 | A * | 12/1927 | Egan | 404/4 |
| 5,232,587 | A * | 8/1993 | Hegemier et al. | 210/163 |
| 5,405,539 | A * | 4/1995 | Schneider | 210/163 |
| 5,498,331 | A * | 3/1996 | Monteith | 210/532.1 |
| 5,904,842 | A * | 5/1999 | Billias et al. | 210/162 |
| 5,925,242 | A * | 7/1999 | McGhee | 210/164 |
| 5,980,740 | A | 11/1999 | Harms et al. | 210/162 |
| 6,080,307 | A | 6/2000 | Morris et al. | 210/163 |
| 6,106,706 | A * | 8/2000 | Roy et al. | 404/4 |
| 6,106,707 | A | 8/2000 | Morris et al. | 210/163 |
| 6,190,545 | B1 * | 2/2001 | Williamson | 210/155 |
| 6,217,757 | B1 * | 4/2001 | Fleischmann | 210/163 |
| 6,231,758 | B1 | 5/2001 | Morris et al. | 210/163 |
| 6,368,499 | B1 | 4/2002 | Sharpless | 210/164 |
| 6,676,832 | B1 * | 1/2004 | de Bruijn et al. | 210/163 |
| 6,743,354 | B1 * | 6/2004 | Evans et al. | 210/170 |
| 2002/0057944 | A1 | 5/2002 | Adams et al. | 405/39 |

* cited by examiner

*Primary Examiner*—Christopher Upton
(74) *Attorney, Agent, or Firm*—Charles C. Logan, II (57) ABSTRACT

A hydraulic-permeation type environmental water-runoff filtration-system applicable to street curb-inlet type drainage-chambers, which generally cooperatively interconnect with street and parking-lot drains. The BLUEBAY-BMP™ pollution-trap provides advantage of community-tailored filtering stages, the preferred embodiment seting forth a convenient user-friendly prefabricated-kit assembly employing a basic build-in-place containment-housing which can be readily adapted to the studied needs of a given community,—without incuring alteration of existing sewer-stormdrains. The uniquely adaptative capability of the containment-housing enables selectively structuring multi-stages of filtration, which progressions address a variety of ecosystem-contaminants, ranging from basic street-refuse and floatable objects, to coarse sediment, finer silt, and comparatively minute albeit environmentally-hazardous petrochemicals, heavy-metals, phosphates, and nitrates;—all of which are readily retrieved from the apparatus confines via periodic maintenance for transfer to appropriate collection handling facilities.

15 Claims, 3 Drawing Sheets

STORMDRAIN CURB-INLET MULTI-STAGE FILTRATION-UNIT

BACKGROUND OF THE INVENTION

1. Field of Invention

This invention relates to stormdrain pollutant-trap apparatus; and more particularly it relates to such apparatus specifically adapted to treat water-flow into existing curb-inlet subterranean drainage-chambers of an existing stormdrain-system.

2. Background of the Invention

Geo-ecologically, storm-water runoff is a natural cyclical hydrological occurrence in which more recent human activities, particularly owing to urbanization, result in often problematical changes to the natural hydrology of a watershed area. Through the ages, water has naturally percolated through pervious surfaces in which soil-filtration and biological action naturally remove pollutants; however, upon urbanization, pervious surfaces are changed by landmovers to become unnaturally reconfigured to man's needs largely as sealed-surfaces (ie: via pavement), thereby evading nature's advantageous percolation effect.

Examples of structural treatment installations include infiltration-systems, retention-basins, sand/oil-interceptors, catch-basins, and curb-inlet drainage-chambers. Catch-basins are generally connected into a stormdrain-system, and are devised to trap settled solids by means of a settling zone sump staged just below the sealed graded-surface surround directing the flow to the catch-basin inlet; and so catch-basins typically employ an uppermost grated-inlet facilitating foot and wheel travel thereover.

Drainage-chambers are also connected into a stormdrain-system having numerous such curb-inlet stations (some of which may only be catch-basins), generally empting into a town's stormdrain-system outfall-site(s) into low-lying rural areas such as beaches, rivers, streams, lakes, and marsh-like back areas of the local eco-system. Accordingly, since stormdrain systems are not typically merged with a community's underground sewer-treatment system, the early to mid 20th-century notion of simply allowing urban-runoff to be assimilated by the ecosystem, is now looked upon as seriously flawed. This runoff is generated, for example, by natural rainfall upon sidewalks, roadways, rooftops, airports, and industrial-sites. overburdened by rapid population growth, the ability of the permeable countryside to effectively assimilate environmental pollutants has essentially ended. Hence, the criticality of thoughtfully managing the polluted runoff from community businesses and street-borne contaminants such as vehicle oil-drippings, brake-dust, tire-wear particulates, and settled air-borne smog-contaminants; is becoming an obvious hazard, as we witness the pervasively declining health of our nation's ecosystem.

In 1987, the U.S. Congress added Section-402(p) to the Federal Clean-water Act, and was thus inaugurated by 40-CFR/#122/123/124 of November-1990;—a federal-statute requiring NPDES/(National Pollutant Discharge Elimination Systems)-permits for stormwater runoff discharges from municipalities and industries (including construction sites). Such NPDES-permits authorize the discharge of storm-water only, thus prohibiting (enforced by stiff fines) any pollutant contamination entering the stormwater conveyance system; which object is to virtually eliminate (or at least dramatically reduce) dependence upon our natural ecosystems for combating these man-caused pollutants from disturbing nature's normal process of dealing with mild Ph-toxicity. Moreover, it has been decreed that this thoughtful, if ambitious, governmentally overseen program be accomplished within the domains of individual United States via what is referred to as "BMP's" (Best Management Practices);—defined as any program, technology, process, siting criteria, operating method, or device, which effectively controls, prevents, removes, or reduces pollution of the ecosystem.

Because complete elimination of environmental pollution is simply not realistically feasible (ie:—unknowingly, a bucket of paint accidentally falls off the back of a truck for example), once a pollutant is generated it must be controlled; and, there are three ways of controlling pollutants in urban-runoff . . . First, via source reduction BMP's, such as through improved industrial, construction, and municipal practices which better prevent improper wastes, and by immediately cleaning-up any inadvertent contaminant-spill (recognizing that accidents do happen), and via a vigorous employee and public "anti-pollution practices" education-campaign to significantly reduce potential pollutants at the source. Secondly, via statute imposed fines for flagrant violation. Thirdly, via BMP treatment apparatus developed to decontaminate the stormdrain-runoff as best possible, and are relatively costly owing they most certainly require regular maintenance in order to remain effective.

Particularly of concern to developers of structural BMP's is the naturally intermittent action of storm events, especially the first-flush phenomenon;—wherein dry-periods without sporadic rains allow concentrations of pollutants to build-up and be flushed away from roadways as very potent concentrations in the stormwater. Thus the flushing of pollutants is especially harmful after a dryspell, because ensuing stormwaters drive the pollutants into relatively low-lying marsh and low-flow streams where they settle, inflicting further environmental damage to an already strained local ecosystem.

Such harmful environmental pollution from contaminated stormwater runoff, is associated with sediment, petro-hydrocarbon compounds, and other chemicals; all of which is terribly detrimental to micro/macro-organisms, and indulging aquatic and avian life; while the supporting base of benthic invertebrates is decimated by the very interference with the natural photosysthesis-process (ie:—respiration, growth, reproduction) vital to ecosystem survival. The stormwater sediment also carries with it toxic levels of trace metals and nutrients; all of which must be substantially captured prior to entering natural areas where wildlife must be allowed to propagate much as it has successfully for thousands of years prior to interference by man's unnatural structures.

RELEVANT PRIOR-ART

Background research discovery provides some selected (out of several dozen stormdrain relevant disclosures) prior patent-art regarded as in some manner germane to this disclosure, chronologically for example in U.S. Pat. No. 5,788,849 (filed: June 1995) is shown a catchbasin type of vertically-tiered filtering apparatus, designed for installation directly beneath an in-factory or parking-lot surface-grating inlet. A lift-out rack is provided for holding the stacked filters, and the rack is then inserted down into a holding-tray, and the perforated surface-grating is then replaced as to enable walking or vehicle traffic to cross thereover; hence typifying construction of the sort not at all adaptable to curb-inlet hydrodynamics.

In U.S. Pat. No. 5,980,740 (filed: January 1998) is shown a true curb-inlet type of pollutant filtration system, wherein is provided a screen covered spiral-hoop like frame structure which open-end is suspended up proximal the ceiling of the storm-drain chamber while its opposite end is fastened intimately upon the chamber's existing outflow-pipe, thereby only rudimentarily filtering storm-water pouring through the spiral-spaces prevailing between the spiral structure.

In U.S. Pat. No. 5,958,226 (filed: August 1998) is shown another area runoff catchbasin type stormdrain adapted with a bypassable peripheral-filter replaceable-cartridge type of filtering system;—which is not adaptable to curb-inlet usage.

In U.S. Pat. No. 5,855,774 (filed: March 1997) is shown another area runoff catchbasin type of stormdrain adapted with a cage designed to receive a rack fitted with series of vertically-tiered specialized filter units; but again, there is no proposal that this filtering structure could be adapted to curb-inlet application, particularly in as much as it's configuration does not facilitate installation into the relatively restricted access openings known to curb-inlet type structures.

In U.S. Pat. No. 6,015,489 (filed: January 1998) is shown a flexile vertical-screen which is installed at the mouth of the curb-inlet stormdrain, whereby street refuse is thus caused to cluster outside this barrier for periodic collection by municipal street cleaners; whilst in the event of a torrential inflow condition, the barrier eventually yields inwardly at the bottom to facilitate greater waterflow. However, its effectiveness is obviously limited to filtering relatively large objects, not heavy-metals nor hydrocarbon based pollutants.

In U.S. Pat. No. 6,080,307 (filed: September 1998 by Abtech-Industries) is shown a stormdrain pollutant-trap employing a plurality of regularly spaced-apart vertical-teeth forming a grating within the curb-inlet's mouth as to block passage of most large street refuse such as bottles, twigs, newspaper, etc., while inset there behind is a pitched finer-grating enabling liquid-inflow to precipitate down into an elongate downwardly filtering canister having an open-mesh bottom thereby causing stormwater to flow-down through and exit at the bottom of the canister. This unit is capable of isolating hydrocarbon contaminants, while larger objects which elude the vertical-teeth grating are pitched across into an elongate catch-basket for subsequent routine maintenance collection.

In U.S. Pat. No. 6,106,707 (filed: February 1999 & U.S. Pat. No. 6,231,758 filed: August 2000 by Abtech-Industries) is shown a true curb-inlet type of pollutant-trap apparatus of perforated modular construction, whereby plural such basket like so called hoppers are arranged as necessary contiguously along the elongated curb-inlet mouth. It is said that large refuse is captured by the inherent basket-design, while smaller contaminants including hydrocarbons are passed into the perforated sidewalls where they are said to be captured by a multitude of irregular microscopic fragments of a hydroscopic copolymer material,—which is perodically emptied via a perforated draining trapdoor-bottom. The practical feasibility of disposing of the contaminated fragments out the trapdoor-bottom, then replenishing them with fresh fragments and fresh refuse-containers is not clearly addressed in the disclosure.

In U.S. Pat. No. 6,217,757 (filed: April 2000) is shown another catchbasin type of pollutant-trap employing a disposable tubular-cartridge beneath a traffic-grating, and including an imperforate support-tray providing an annular debris-trough for larger objects while the street water-inflow is required to permeate the filtering-media provided within the tubular-cartridge;—while excessive waterflow is allowed to spill-over the top of the tubular-cartridge as to escape unimpeded down the central chute.

In U.S. Pat. No. 6,270,663 (filed: July 2000) is shown another catchbasin stormdrain type filtering system of disposable-basket configuration, wherein the sidewalls and bottom employ permeation-ports while backed-up hydroststic-pressure is used to force contaminated water through the filtering-screens,—in combination with uppermost overflow-ports to facilitate overwelming water passage.

In U.S. Pat. No. 6,368,499 (filed: September 2000) is shown a curb-side catch-basin (not a curb-inlet type) grating-suspended disposable-filter assembly holding an underslung perforated housing containing a replaceable pillow-shaped filtering medium. This design is exemplified here as to better point out that owing their entirely different flow-paths and physical arrangement, curb-side catch-basins have little relevance to actual curb-inlet installations designed to accommodate a much greater inflow-volume.

In U.S. Pat. No. 6,402,0942 (filed: March 2001) is shown a curb-inlet mounted filter which is supported in place by a transverse-bar said to be screwed to supposedly existing grating-teeth at the curb-inlet;—however, most curb-inlets do not employ vertical grating-teeth, and the very notion of obstructing the curb-inlet with a fixed filter-unit is impractical owing it would adversely impede inflow to the drainage-chamber connected to the stormdrain-system.

In U.S. Ser. No. 09/844,487 (flied: April 2001) is shown another curb-side catch-basin grating-fed pollution-trap of preferred two-piece construction; wherein a perimeter-flange is employed to suspend the assembly directly beneath the street-grating, thereby assuring full-flow of water into the unit. The polluted-water thus flows in from all sides into a sump like center, wherein the water is then compelled to flow outward and up into a peripheral filtering-chamber where hydrostatic-pressure forces the water through a filtering-medium and out via perimeter-apertures. Unfortunately, the full-flow design is subject to clogging by various debris, which could render it inoperative as a necessary water-outlet,—thereby potentially resulting in adverse street flooding.

Therefore, in full consideration of the preceding patent review, there is determined a need for an improved form of device to which these patents have been largely addressed. The instant inventors hereof believe their newly improved stormdrain-system apparatus, commercially referred to as the "BlueBay-BMP™" pollution-trap unit, currently being developed for production under auspices of ClearWater-Solutions™ Co.,—exhibits certain major advantages to be revealed in subsequent portion of this instant disclosure.

SUMMARY OF THE INVENTION

In view of the foregoing discussion about the earlier related invention art, it is therefore important to make it pellucid to others interested in the art that the object of this invention is to provide a more effective pollutant-trap specialized for curb-inlet type drainage-chambers. While it is found that curb-inlet drainage-chambers of stormdrain-systems can presently vary substantially (no federal-standard as yet) in their physical properties, a common requirement is that it be built substantially subterraneanly, and adjacent to a necessarily slightly pitched roadway, so as to thereby receive water runoff naturally gravitating to a lower place. Accordingly, a typical curb-inlet has a mouth-width (ie: dimension extending parallel to roadway) measuring from about 4-feet, to as much as approximately 28-feet in length, and preferably level with the lowest surrounding road-surface (except where the road is necessarily sloped to the incline of a hill). The upper-edge of the curb-inlet's mouth is usually formed by the lower-edge of a roof-like pedestrian-sidewalk structure extending as a parallel gap usually about 6-inches above the road-surface;—thereby resisting excessively large objects from becoming swept therein during an inrush of stormwater (some communities include integral vertical safety-gratings, preventing the potential hazard of family pets and even small-children being swept-in by the potentially powerful inrush-current). The existing drainage-chamber itself generally measures about 4-feet wide (parallel to the curb-inlet) and 4-feet deep (back from the curb-inlet), and is permanently constructed of poured-concrete, creating four vertical walls (which can vary considerably in height) with an integral concrete floor, thereby forming a box-like space, into which lower confine is necessarily provided an outlet communicating in a down-line gravitating manner with the primary stormdrain-system. Additionally, sometimes a series/inlet-pipe feeding from one or more up-line drainage-chambers is also present. Usually, the only HMA (human maintenance access) is provided by presence of a minimal 19"–21"/diameter castiron-lid (made heavy to discourage tampering) covered manhole, typically provided in the roof-like sidewalk extending centrally above the drainage-chamber;—although additional limited access for tools and passage of collapsed elongate hardware panels can also be introduced for systematic assembly via the curb-inlet mouth itself.

A.) accordingly, an object of this invention disclosure is to set forth a cost-effective gravity-powered pollutant-trap apparatus, adapted for convenient retrofit into an existing curb-inlet type subterranean drain-chamber of a stormdrain-system. Therefore, owing the previously described access provision limitations, the inventors hereof determined the pollutant-trap is to be a novel collapsible apparatus defining a containment-housing comprised of waterproof prefabricated sections, preferably of planar shape whereby the separate prefabricated panel like members can be simply passed into the drainage-chamber confines through the curb-inlet mouth, and then readily assembled therein into a unified rigid structure by a single installer person,—preferably assisted by an outside workman. Following this notion, an open-top water gathering imperforate containment-housing assembly is achieved, having a forward-wall portion made contiguous with left and right sidewall portions joining contiguously with an aftward-wall portion and a bottom panel portion. The stated aftward-wall provides a spillway for managing any water-inflow exceeding the containment-housing's normal hydrostatic-permeation flow-capacity; and the assembly includes a fixed mounting which locates the uppermost edge of the stated forward-wall proximally below the mouth of the curb-inlet. An optional transverse-bulkhead is also preferably included, which extends up from the stated bottom panel, and contiguously between the stated sidewall portions; thereby devising a forward sediment-chamber and an aftward silt-chamber. The sediment-chamber preferably includes a maintenance replacable hydrocarbons absorbent-unit which is suspended therein, both of the chambers being readily accessible from above for periodic maintenance-crew clean-out generally via heavy-duty commercial vacuum-cleaner type equipment; plus, the transverse-bulkhead preferably includes a debris-grated transfer-aperture, wherein hydrostatic-pressure acts to force water into the silt-chamber while capturing additional debris. Note that where permissible, two or more of these modular containment-housings can be installed ganged in side-by-side arrangement as to thereby better accomodate adaptation to those stormdrain-chambers of extended length. Additionally if desired, this pollutant-trap unit can be alternately installed oriented at a right-angle to the curb-inlet mouth, upon the vertical/side-wall immediately below the long stormwater left or right lateral entry-chute integrally-formed of concrete into many drainage-chambers today;—thereby further underscoring the versatility of this disclosure. Hence, the containment-housing hereof is equally adaptable to left sidewall, center wall, or right sidewall installation of the existing drainage-chamber; although for sake of disclosure clarity, we shall herein be focusing upon the essentially typical frontal-wall adaptation.

B.) Another object of this invention disclosure is to set forth a storm-drain pollutant-trap apparatus according to preceding item-A, which is comprised of multi-stages, beginning with a first-stage grating-ramp arranged on sufficient pitch proximal the existing curb-inlet mouth as to thereby divert oversize incoming objects there across and down into a collection-basket for periodic maintenance-crew clean-out. Beneath this first-stage grating-ramp is located the containment-housing assembly comprising a forward-wall panel joining contiguously with both left and right sidewall panels, and with a contiguous aftward-wall panel, plus with a bottom panel; all prefabricated to be readily assembled in a substantially water-tight manner within the drainage-chamber. Note that one or more optional weep-ports are preferably included proximal the lower-most confines of the containment-housing, so as to obviate any occurrence of stagnant water formation.

A basic second-stage coarse-sediment chamber is provided within the containment-housing itself, which receives those pebble-sized objects precipating down through the first-stage grating-ramp that opens as to conveniently facilitate periodic maintenance clean-out; and preferably also includes a suspended auxiliary floating hydrocarbons absorbent-unit to also be replaced during periodic maintenance. Also, by installing a water tight optional transverse-bulkhead contiguously between the two stated side-walls and bottom panel, the containment-housing is given a transverse third-stage silt-chamber. Stormwater hydrostatic-pressure thus builds-up within the sediment-chamber against this transverse-bulkhead, which is provided with a transfer-aperture through which the water is thus forced at a controlled rate into the aftward silt-chamber, whereby the polluted stormwater becomes further broken-down by enabling suspended silt to settle to the bottom of the silt-chamber for periodic maintenance-crew clean-out. The afore stated aftward-wall member also preferably forms a spillway, whereby partially cleaned stormwater thus exits. An adjoining optional fourth-stage transverse auxillary/silt-chamber located behind stated aftward-wall, serves to collect finer grit silt also for periodic maintenance-crew clean-out; plus, an optional fifth-stage vertical transverse TSS (total suspended-solids)-filtering unit is also arranged contiguously between the thus extended stated left and right sidewall and bottom portions of the containment-housing. This fifth-stage effectively creates a porous wall-like surface, where the now much cleaner stormwater passing through the stated fourth-stage auxillary/silt-chamber can again build-up hydrostatic-pressure against the stated fifth-stage TSS-filtering media for final flow-through cleansing before passing into the drainage-chamber for delivery into the stormdrain-system outlet-pipe. The TSS-filter media is especially effective at collecting so called heavy-metals, pesticides, phosphates, and nitrates; and is basically comprised of ingredients such as activated-carbon, peat, and zeolite. However, the composition of the TSS-filter media can be advantageously customized according to the requirements of the particular neighboring environment;—whereby altering ingredients such as perlite, or crushed-nutshells for example can also be included, substituted, or otherwise mixed as is determined to be most suitable for cleaning a particular local pollution condition.

C.) Another object of this invention disclosure, is to set forth the presently preferred embodiment configuration of the necessarily prefabricated and collapsible structural components comprising our pollutant-trap assembly according to preceding items—A & B. For example, owing to the deliterous effect of water on materials such as treated marine-plywood or galvanized-metal (plus the fact that galvanized materials are not being employed owing the considered possible zink-leaching hazard), we have opted for stainless-steel and/or (possible combination) polyester laminated or chopper-gun molded fiberglass, or vacuum-formed approximately ⅜-inch thick laminate-composite ABS material (outer-facing vinyl-skin, frothed-vinyl core, with inner-facing skin of white-vinyl) of as being practical;—while having strength to withstand the approximate 30-gallons of water potentially flowing through the pollutant-trap's assembled containment-housing paneling structure during any one instant of peak water inrush periods.

It is presently preferred that the approximate 50-lb empty-weight of the once assembled preferably rigid containment-housing be supported forwardly upon a single approximately 30-inch elongate horizontal L-shaped metal hanger-bracket, having through-holes along its 3-inch vertical-leg portion, into which are secured a plurality of 9/16"-diam.shank stainless-steel lag-bolts moored into female-anchors bored into the existing concrete-wall below the mouth of the existing curb-inlet. Thus, in this embodiment, the transverse underside forward edge of the containment-housing is supported solidly upon the remaining thus outwardly cantilevered 3-inch shelf-like leg of the L-shaped support-bracket; while the aftward underside of the containment-housing is preferably braced upon a transverse aft suspension-bracket. This suspension-bracket is a simple approximately 45-inch long stainless-steel L-shaped cross-sectionally with approximately 1-inch legs, whereby one leg provides an elongate-pad upon which the aftward underside of the containment-housing rests. The opposed ends of this suspension-bracket includes oppositely screw-threaded support-shanks, each of which engages securely into a single counter-bore drilled into the respective opposite left and right vertical-walls of the cave-like drainage-basin. Additionally, a plurality of anchor-bolts can also be spaced proximally along the upper horizontal terminus of the aftward-wall of the containment-housing and therethrough into the vertical forward-wall of the drain-basin; which anchor-bolt array can thus either supplement or entirely supplant need of the afore described suspension-bracket. Therefore, if only the formerly described hanger-bracket were employed in combination with the latter upper terminus anchor-bolt array, then the containment-housing would be suspended from the forward-wall of the drainage-basin in an outwardly fully-cantilevered manner.

Accordingly, what has been described is a very robust fixed mounting means, which affords an expedient method by which to readily adapt the containment-housing up from the floor region of most any existing drainage-basin;—thereby enabling stormwater to flow unimpeded thereunder, as the drainage-chambers often have an inflow-pipe at one side-wall while the opposite side-wall may include an out-flow-pipe through which flows stormwater collected from other drainage-chambers or catch-basins.

The resulting containment-housing itself is to be largely constructed of linearly interlocking 90-degree flange reinforced edges, some of which may include extruded-rubber seals (or alternately sealed during the assembly stages via a conventional silicoln/calking-gun); while being positively united via substantially conventional strategically located stainless-steel fasteners (and/or press-on flange-clips), thereby enabling easy field disassembly for quick maintenance-repair, or possible future retrofitting of an updated component. Because workman entry into the drainage-chamber is governed by OSHA-requirements for a safety-hoist apparatus and all, it is desired that drainage-chamber bodily entry involvement be kept to a minimum. Accordingly, the aftwardly slanted-down first-stage grating-ramp panel is preferably of one-piece construction, and in order to facilitate convenient periodic maintenance-crew industrial/vacuum-cleaner hose access into the confines of the containment-housing, the readily removable grating-ramp panel portion is easily snagged by an outside maintenance-workman's special Lanyard-pulltool (not disclosed), and the grating-ramp is thereby simply withdrawn slidingly up and forward manually through the mouth of the curb-inlet.

Our installed pollutant-trap unit hereof being thus designed to accomplish convenient efficient routine periodic-maintenance procedures primarily via the curb-inlet mouth;—thereby enabling maintenance-workmen to perform their periodic cleaning-task entirely externally of the drainage-chamber, while positioned proximal the roadbed-surface at the curb-inlet. The debris collection-baskets suspended at the back of the containment-housing, are also accessed externally from above, by simply lifting them up separately through the opened sidewalk manhole;—whereupon they are thus emptied into the Maintenance-truck's refuse-bin for subsequent mass-collection disposal. The manhole-cover being finally replaced, and the preferred crew of only two then moving-on to repeat the just described task at their next scheduled maintenance-route pollutant-trap drainage-chamber.

D.) Another object of this invention disclosure, is to set forth the novel systematic steps by which the necessarily prefabricated and collapsible structural components comprising our pollutant-trap assembly according to preceding items—A, B, & C, are to be preferably installed. Thus initially, an installer person enters the drainage-chamber via an existing manhole, and sets about installing a special hanger-bracket with the aid of a conventional bubble-type leveling-tool and conventional concrete-drill. the aftward support-bracket is next installed, by drilling two opposed support-holes in the opposite left and right sidewalls, into which the support-bracket's expansion-studs are inserted until the support-bracket is firmly secured; at which point the lowermost tray portion of the containment-housing is introduced into the drainage-chamber via the curb-inlet's mouth, the installer resting the tray's forward-end upon the provisional shelf like flange of the hanger-bracket, and the aftward-end of the tray upon the transverse pad provided by the support-bracket.

Next, the forward-panel member is introduced into the drainage-chamber via the curb-inlet's mouth, and placed atop the previously installed tray member, and vertically against the forward-wall; then using the anchor holes provided proximal the upper-end of the forward-panel, the installer drills pilot-holes for receiving bore-anchors, and then affixes the forward-panel via conventional anchor-bolts.

Now the right and left side-panels and aftward-panel are likewise introduced via the curb-inlet's mouth, and positioned upon the tray so as the three panels are vertically arranged contagious with the forward-panel; and thereby attaining an open-top basic containment-housing. To this structure can be added the transverse-bulkhead, and the aftward support-frame via the curb-inlet's mouth. Also, the left and right TSS-filter cartridges are then introduced via the manhole, as are the left and right collection-baskets; whereupon the grating-ramp can be introduced via the curb-inlet's mouth, sliding it aftward until it drops securely lodged atop the containment-housing. Then the lateral-trough is to be installed between the grating-ramp and drainage-chamber sidewall at left or right (or at both locations); plus, a lateral-ramp can also be introduced via the curb-inlet's mouth and installed at the left or right (or both left and right when appropriate). At this juncture the installer exits the drainage-chamber, and replaces the manhole-lid to finalize the installation.

DESCRIPTION OF THE PREFERRED EMBODIMENT DRAWINGS

The foregoing and still other objects of this invention will become fully apparent, along with various advantages and features of novelty residing in the present embodiments, from study of the following description of the variant generic species embodiments and study of the ensuing description of these embodiments. Wherein indicia of reference are shown to match related matter stated in the text, as well as the claims section annexed hereto; and accordingly, a better understanding of the invention and the variant uses is intended, by reference to the drawings, which are considered as primarily exemplary and not to be therefore construed as restrictive in nature; wherein:

ITEMIZED NOMENCLATURE REFERENCES

Existing-Structure:
10,10',10",10s—curb formation: upper-edge, lower-edge, mouth, inlet surface
11,11',11",11E—street-surface, street gutter, adjacent terrain, earth surround
12',12"12H,12L—sidewalk: top-surface, under-surface (ceiling), manhole, lid
13,13',13",13L/13R—drainage-chamber: forward-wall, aftward-wall, floor, Lt./Rt.-sidewall
14,14',—concrete lateral-chute, outlet-pipe
15,15',15"—approaching water, advanced inflowing water, water-discharge
16—refuse (twigs, leafs, waste-paper, rocks, bottles, etc.)

New-Structure:
17,17',17",17x—containment-housing, sediment-chamber, silt-chamber, aux.silt-chamber
18,18L/18R,18'/18"—fwd.-panel, Lt./Rt. side-panels, retention-bezel, tray top/underside
19,19',19",19G—transverse-bulkhead, transfer-aperture, aperture-shroud, debris-grating
20,20',20"—aftward-panel, spillway, spillover-action ref.-arrow
21,21',21",21c,21A—grating-ramp, aperture, grating bars, bypass-cover, bypass-action
22,22',22",22G,22A—lateral-trough, upward-flange, lateral-ramp, inboard-guide, apron
23,23'—disposable hydrocarbons absorbent-unit, mooring-tie
24L/24R—TSS-cartridge: left/right
25L/25R,25L'/25R'—med.-grade TSS-filters: left/right, fine-grade TSS-filters: left/right
26,26',26"—fixed TSS-cartridge support-frame, flow-aperture, retention-paws
27'/27",27—large-refuse collection-baskets: left/right, hanger-hooks
28A,28B,28C,28D,28E—advances: 1st-stage, 2nd-stage, 3rd-stage, 4th-stage, 5th-stage
29,29',29",29B—hanger-bracket, shelf-leg, mounting-holes, mounting-bolts
30,30'/30",30P—support-bracket, Lt./Rt. expansion-studs, support-pad
31,31',31",31B—upper forward anchor-bolt, large-washer, anchor-hole, bore-anchor
32,32'/32"—hydrostatic-pressure action ref.-arrows: 2nd-stage, 5th-stage: in/out
33,33',33"—aft panel-flange, forward panel-flange, flange-fasteners
34'/34"—weep-ports: forward/aftward

DETAILED DESCRIPTION OF THE PREFERRED EMBODIMENTS

Figure 1:
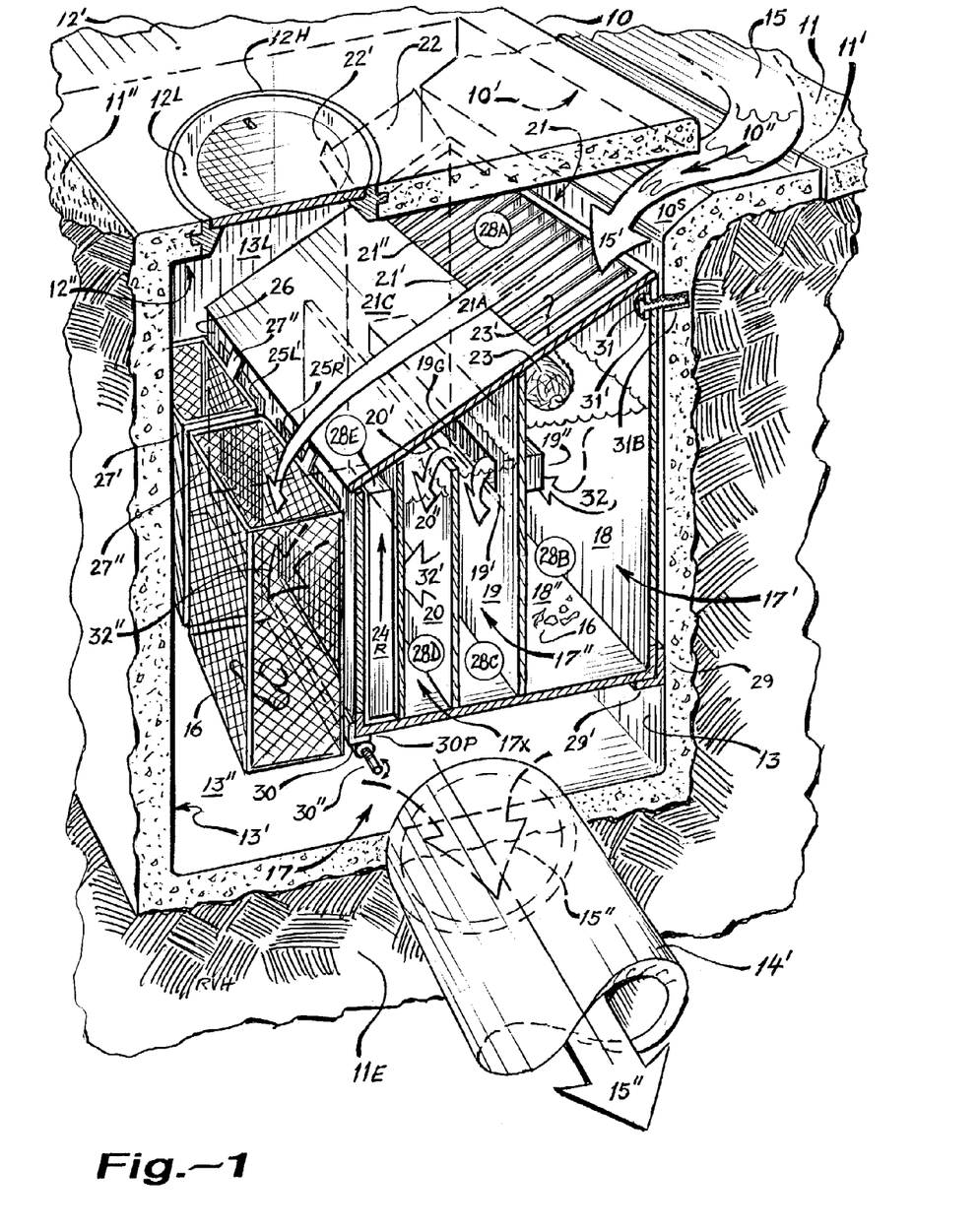
FIG. 1, is a semi-diagrammatic cross-sectional upper-oblique side/elevation-view exhibiting the general environment and installation of our preferred pollutant-trap embodiment, as observed from a lateral right aspect thereof, and whereto the exemplified pre-existing drainage-chamber's entire right-sidewall has been omitted for desired visual clarity therein.

Initial reference is given by way of FIG. 1, wherein is exhibited the basic installation relationship and functions of this pollutant-trap invention disclosure relative to the existing curb-inlet's exemplified mouth 10". Approaching polluted water 15, be it stormwater as the result of a torrential winter rain, or just minor summertime water-sprinkler excess flow-off from a nearby neighborhood lawn 11" (possibly sprayed with herbicide or pesticide pollutants), is generally caused to flow from appropriately sloped street-surfaces 11 and adjacent concrete sidewalk top-surface 12', then along curbside concrete street-gutters 11' and into the existing drainage-chamber via the curb-inlet's concrete lower-surface 10s (generally forming a slopped entry transition from gutter 11'). Portions of the pre-existing poured-concrete drainage-chamber shown as viewing forward in FIG. 1 include forward-wall 13, aftward-wall 13', floor 13", left-sidewall 13L (right-sidewall 13R omitted here for viewing clarity), ceiling 12" (generally the under-surface side of sidewalk), and its maintenance access manhole with annular lid-support flange 12H and accompanying steel manhole-lid 12L (manhole members shown circular, although some are square).

Our prefabricated and usually assembled in place pollutant-trap unit shown in FIG. 1 typifies our present preferred embodiment, and as such is subject to constant refinements, albeit within the spirit and scope of this disclosure. Accordingly, the once retrofitted (ie—assembled into an existing drainage-chamber) containment-housing 17 is shown suspended in preferred cantilevered manner, obviating need for cumbrous floor directed support-legs (none shown), whereby one or more anchor-bolts 31 are passed through upper-forward anchor-holes 31" and into anchoring bores and standard bore-anchor 31B drilled into forward-wall 13. This upper mounting is preferably assisted by a lower forward transversely elongate horizontal hanger-bracket 29 also mounted upon forward-wall 13 (similarly as with 31 above, via mooring-bolts 29B per FIG. 2); its L-shaped cross-section providing an outwardly extending shelf-leg 29' upon which the lower frontal transverse edge of containment-housing 17 solidly rests. An additional mounting support option is provided by the aftward transversely elongate support-bracket 30 which L-shaped cross-section provides support-pad surface 30P, and fitted with screw-threaded expansion-studs 30" (opposite mirror-image expansion-stud 30' not viewable here) which can be readily lengthened with a wrench, as to enter into respective support-bores (not visible here) predrilled into adjoining left 13L and right (not visible here) lateral concrete drainage-chamber sidewalls; these mounting devices being further exhibited in FIG. 2.

Tracing the Decontamination Process:

There remain subtle, however vital other differences which are to become herein more evident and understood as important improvements. For example, FIG. 1 further reveals how the different portions of the pollutant-trap cooperate to provide progressive stages of cleaning as the entering so called stormwater advances through the pollutant-trap. The 1st-stage is thus realized at point 28A (note: encircled stages 28 identify stormwater cleaning progressions only,—not structural elements), where incoming objects become thereby sized as to either deflect-aftwardly over slopped grating-ramp 21, or, fall directly through aperture spaces 21' interstitial to grating-bars 21", and gravitate down to the bottom upon tray top surface 18', or float therein, while hydrocarbons (ie—road grime runoff for example) are substantially drawn into the floating absorbent-unit 23. As mentioned, larger items such as fallen twigs and discarded beverage containers are gravity shuttled 21A (action ref.-arrow) across bypass-cover portion 21C, to be captured within aftwardly located modular collection-baskets 27'(left) and 27"(right). These wire-mesh baskets are preferably constructed of weight advantaged anodized-aluminuum (about one-third the weight of costly stainless-steel baskets), and suitably dimensioned as to thereby be individually snagged and pulled-up through once opened manhole 12H (here shown normally covered by manhole-lid 12L), whereupon the emptied baskets are passed back down the manhole 12H to their shown respective hanging positions via at least one inverted U-shaped hanger-paw 27 here exemplified simply engaging over the top-edge of support-frame 26 of containment-housing 17.

The stormwater flowing down through grating 21" openings 21' in FIG. 1 is thus initially restricted to filling the 2nd-stage (28B) sediment-chamber 17' where the water level will exceed the height of the transfer-aperture 19' located within transverse-bulkhead 19;—which resulting hydrostatic-pressure 32' (action ref.-arrow) effect thus forces the stormwater up under surrounding aperture-shroud 19" and through a secondary debris-grating 19G provided within transfer-aperture 19'. This natural sort of gravity energized pumping action 32' and its associated flow thereby effectively helps prevent those medium-sized floatables from entering silt-chamber 17", and the accumulating clinging debris is periodically suctioned away from the forward-side of the debris-grating 21" by a maintenance-crew.

The maintenance-crew thus also accesses the entire confines of the containment-housing by simply pulling the normally lodged in place one-piece bypass-cover 21C frontally upward and out through existing curb-inlet mouth-area 10" bounded above by upper curb-edge 10', below by inlet-surface 10S, and laterally by the curb-inlet's mouth-end portions formed by contegious outward portions of the pre-existing drainage-chamber's sidewalls. Stormwater entering silt-chamber 17" via the transfer-aperture 19' in FIG. 1 is by now becoming significantly cleaner, harboring only relatively small pollutants, some of which precipitate to the bottom tray 18' of the silt-chamber 17" for subsequent maintenance-crew suctioning, while lighter elements suspended within the progressing stormwater is carried over spillway 20' of aftward-panel 20 via spillover 20" (action ref.-arrow) constituting stage-3 (28C). Hereagain, hydrostatic-pressure 32"(action ref.-arrow) naturally builds-up in this stage-4 of cleansing, effects a pumping-action within the Aux./silt-chamber 17X against the disposable left and right tandem arranged TSS-type medium-grade and aftward fine-grade modules (only partial portions 25' and 25" being visible here) positively held disposed side-by-side within convenient TSS-cartridges 24R (note attendant lift-out action ref.-arrow thereto, 24L shown in FIG. 2). Stormwater exiting 32"(action ref.-arrow) this final stage-5 (28E) of filtering is now relatively free of adverse pollutants, so simply discharges upon the drainage-chamber's floor 13" where this discharging-water 15" (and any excess water carried over bypass-cover 21C) flows into the stormdrain-system via outlet-pipe 14'.

Figure 2:
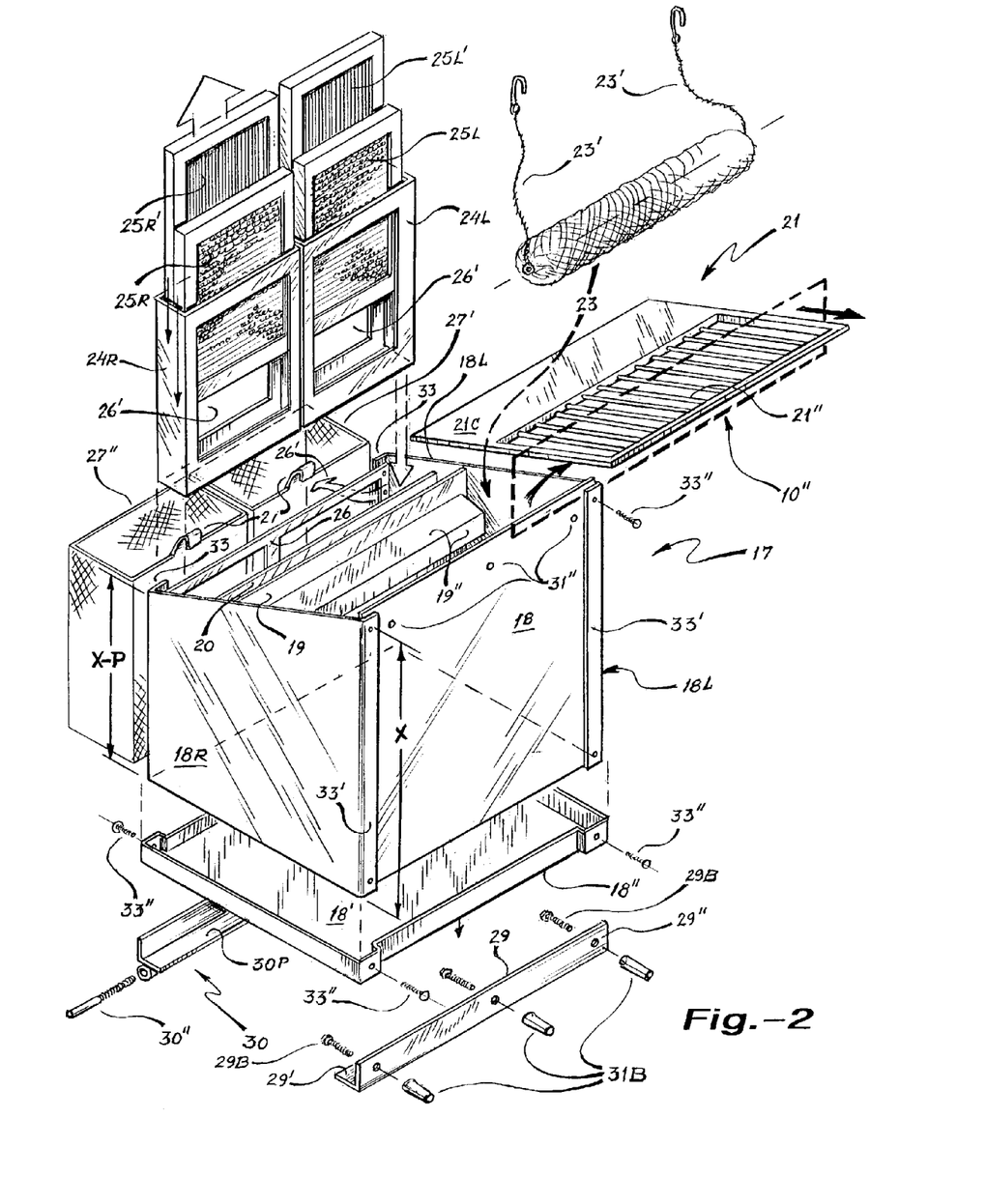
FIG. 2, is an semi-diagrammatic oblique pictorial-view favoring the frontal upper-right portions of the partially dissembled containment-housing itself, including presence of an exemplified drainage-chamber's curb-inlet via phantom-outline.

Maintenance-Crew Accessible Components:

Next, in FIG. 2 we see essentially the same pollutant-trap prior to its necessarily disassembled installation within the confines of the exemplified pre-existing drainage-chamber shown in FIG. 1 In those instances involving brand-new drainage-chamber installations, our pre-fabricated containment-housing 17 hereof, can if preferred, actually be delivered to a construction-site entirely pre-assembled, and thus easily be installed completely pre-assembled just prior to an elongate slab of concrete represented by sidewalk 12' (ref. FIG. 1, replete with manhole portion 12H) being lowered in-place by a large construction-site crane,—thereby finalizing the concrete drainage-chamber. Moreover, installation of our pollutant-trap apparatus at "work in progress construction-sites", even without the final concrete-roof (sidewalk 12') being installed over the concrete drainage-chamber, can conveniently obviate need for providing time-consuming temporary waste-management devices to satisfy stringent federal-EPA requirements for such new construction-site developments.

However, for those already completed "pre-existing" concrete drainage-chambers, the six substantially planar rigid panels 18,18',18",18L,18R preferably comprising the basic structure of our containment-housing 17, are shown in FIG. 2 arranged in a somewhat exploded manner for greater visual clarity. The preferably planar grating-ramp 21 is shown here elevated substantially in the manner by which it is to be dislodged from within the uppermost framing of the containment-housing 17 and manually withdrawn through mouth 10" (shown here phantom outlined only) of an exemplified existing concrete curb-inlet. This is the first-step, enabling maintenance-workers to thereby gain easy access to the containment-housing's confines, so as to next proceed to remove the exemplified disposable HC/absorbent-unit 23 preferably suspended via lanyard hooks 23' within the forwardmost situated stage-2 (ref. 28B of FIG. 1) sediment-chamber 17'. With the preferably combined bypass-cover 21C and aperture 21' of grating-ramp 21, and thereunder disposable absorbent-unit 23 thus both temporarily removed, a maintenance-worker can thereby readily access and clean-out the lower confines of the three generally employed FIG. 1 chambers 17', 17", 17×(chambers 17" and 17x being regarded as options to improve the pollutant-trap's effectiveness) with a commercially available wand-tipped vacuum-hose connected to an industrial/vacuum-cleaner usually built-in to their adjacently parked maintenance-truck (not shown).

At the aftwardmost region (furthest in from the curb-inlet) of the FIG. 2 containment-housing 17, are shown the here lifted-out reusable TSS-cartridge modules 24L and 24R, wherein are housed the here partially withdrawn TSS/medium-grade disposable filter modules 25L and 25R. Immediately aftward thereto are shown the further withdrawn TSS/fine-grade disposable filter units 25L' and 25R"; all four of these filter units usually being replaced during the maintenance-crew's periodic inspection and refreshing of this pollutant capturing apparatus. Additionally, the two large-refuse collection-baskets 27' and 27" are generally also in need of emptying, as described previously.

Figure 3:
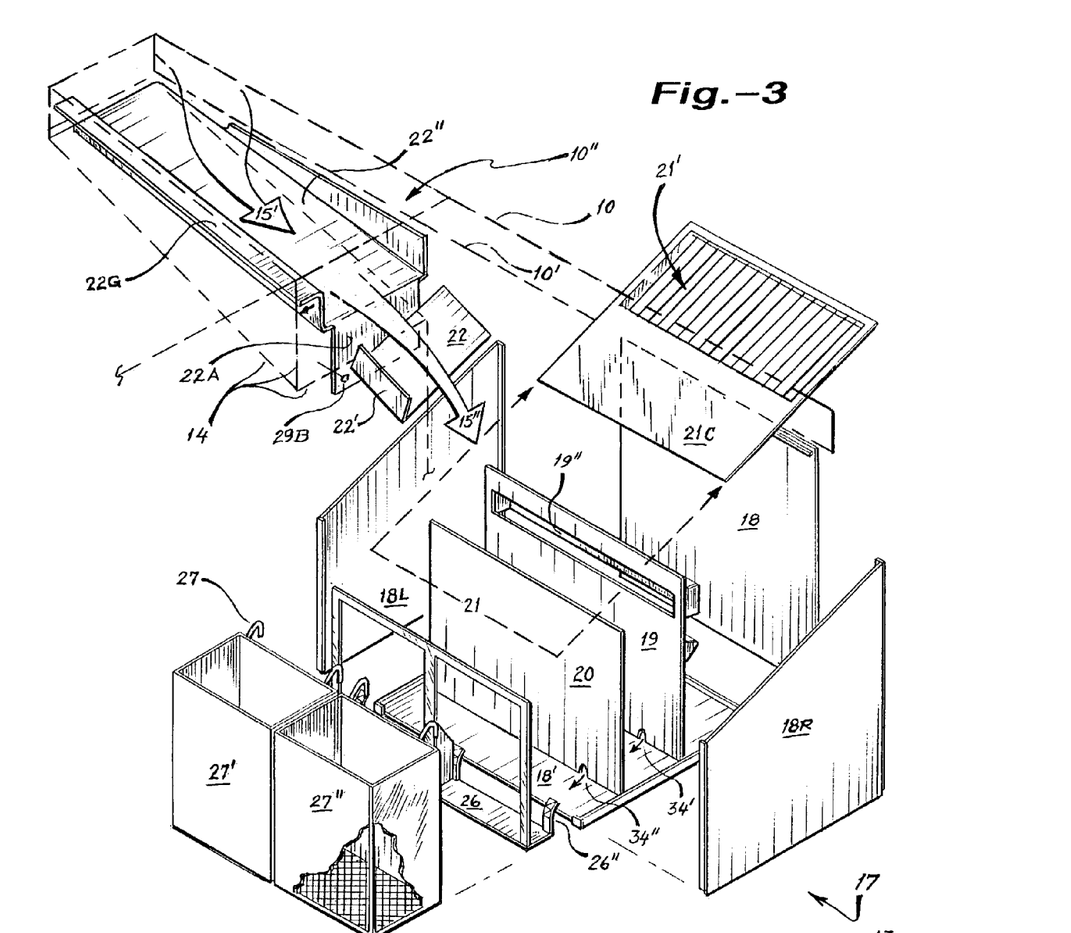
FIG. 3, is an semi-diagrammatic oblique pictorial-view favoring the aftward upper-right portions of the substantially dissembled containment-housing itself, without presence of an exemplified drainage-chamber, and whereto is included a phantom-outlined portion at the upper-left which represents a pre-existing lateral-chute formation portion of some concrete drainage-chambers.

Study of FIG. 3 also reveals two exemplified inverted U-shaped weep-ports 34' and 34", each preferably provided with a stainless-steel screen made into the lower transverse-edges of their respective panels 19 and 20 where they both impinge upon tray member 18'; their purpose being to cooperatively facilitate ultimate if slow drainage of their respective chambers (thereby preventing potential mosquito-larva breeding stagnant-water forming within the containment-housing). Also shown in FIG. 3 is a somewhat abbreviated version of support-frame 26, here with optional retention-paws 26" acting to aid vertical support of the dual slide-in TSS-cartridges 24L and 24R shown in FIG. 2. The generic-variant collection-baskets 27'/27" of FIG. 3 are here shown having flexible canvas-sidewalls and wire-mesh bottoms to maintain necessary drainage. Also shown in FIG. 3 is the horizontally transverse vertical-sash portion of aperture-shroud 19" formed contiguously with short right-angle sidewall end portions, and a solid top portion, creating a rigid awning like surround immediately forward of transfer-aperture 19', thereby very effectively blocking most floatables within chamber 17' from otherwise gathering at transfer-aperture 19', which could adversely impede proper flow of stormwater necessarily moving beneath aperture-shroud 19" via natural hydrostatic-pressure 32' of the once elevated water-level (ref. FIG. 1).

Further reference to FIG. 3, shows an exemplified pre-existing concrete lateral-chute 14 at the upper-left, which is a structural environment feature delineated via phantom-outline (thereby clearly indicating its not being a component of the invention), that will sometimes be present as shown at just one lateral left or right side of the drainage-chamber's curb-inlet mouth 10"; or in some cases, at both left and right lateral extended ends of the curb-inlet mouth. Because this sometimes included concrete lateral-chute 14 is formed generally at a relatively steep-slope, which lower-extremity often approaches our containment-housing 17 at an unworkable discharge point slightly below the position of our grating-ramp's aperture 21', we have adapted an optional prefabricated slide-like gell-coated fiberglass lateral-ramp 22", which is made to readily lodge as a preferred press-fit into the typically 18"-wide U-shaped cross-section of concrete entry-chute 14. Also, because aperture 21' of our grating-ramp 21 preferably extends only about 15-inches aftward of the drainage-chamber's forward-wall 13 (ref. FIG. 1), the optional lateral-ramp 22" therefore necessarily includes a narrowing dog-leg like inboard-guide 22G portion, which lends installation-compliance while narrowing the lateral-ramp's effective chute-width to approximately 14-inches, thus in keeping with our grating-ramp inlet aperture's 21' stated 15-inch dimension. Lateral-ramp 22" is thus a separate optional component introduced into the drainage-chamber via the curb-inlet's mouth 10", the lower-terminus of lateral-ramp 22" preferably including a vertical apron portion 22A having a pilot-hole through which a bore-hole is drilled into the drainage-chamber's left-sidewall for securing a conventional concrete-anchor and fastener 29B. This convenient installation procedure thus enables the installer to readily determine and fix the variable-pitch of lateral-ramp 22", so that its flow-path is critically aligned at its lower-terminus to properly direct incoming stormwater upon adjacent lateral-trough 22, and thereupon into the grating-ramp's aperture 21' as indicated by more advanced approaching water (action ref.-arrow 15"). Introduction of lateral-ramp 22" through the drainage-chamber's curb-inlet mouth 10", is facilitated by momentary deflecting of flexile apron 22A portion sufficiently as to enable passing the lateral-ramp through mouth 10" preferably prior to assembling the containment-housing 17 thereto.

Figure 4:
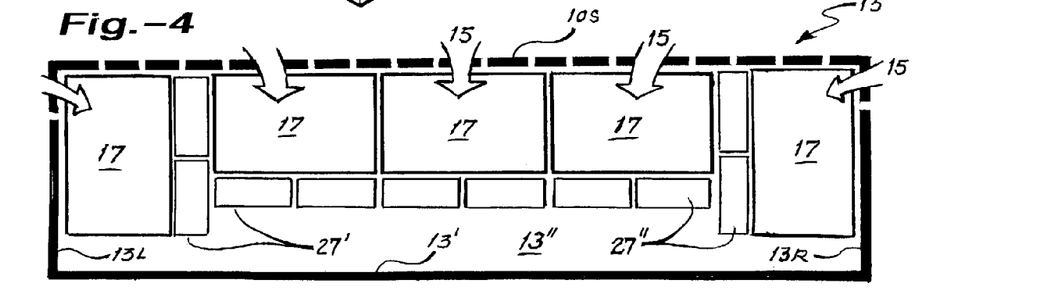
FIG. 4, is an diagrammatic upper/plan-view representing the drainage-chamber and exemplifying the different possible orientation arrangements of our novel pollutant-trap containment-housings therein.

Reference to FIG. 4 plan-view diagram conveys various optional ways we anticipate our pollution-trap containment housings 17 being cooperatively installed juxtaposed to one another;—the broken-line representing the basic curb-inlet-ing 10s of stormwater 15 into an exemplified elongated type drainage-chamber indicated by floor area 13", aftward-wall 13', with left-sidewall 13L and right-sidewall 13R. Such extreme drainage-chambers have two or three manhole-covers, and their elongated curb-inlets are commonly seen along large substantially level (horizontal) urban roadways where stormwater is captured flowing-in from 180-degrees of azimuth.

Therefore, it is now understood how the preferred and generic-variant embodiments of this invention contemplate performing function in a novel way not heretofore available nor realized. It is implicit that the utility of the foregoing adaptations of this invention are not necessarily dependent upon any prevailing invention patent; and, while the present invention has been well described hereinbefore by way of certain illustrated embodiments, it is to be expected that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation, while the appended claims set out the scope of the invention sought, and are to be construed as broadly as the terminology therein employed permits, reckoning that the invention verily comprehends every use of which it is susceptible. Accordingly, the embodiments of the invention in which an exclusive property or proprietary privilege is claimed, are defined as follows.

What is claimed is:

1. A pollutant trap for a curb inlet type subterranean drainage chamber of a stormdrain system, comprising:
    an open-topped imperforate containment housing assembly having a forward panel, left and right side panels, an afterward panel, and a bottom tray mounted within said drainage chamber below said inlet;
    a spillway means in said afterward panel for carrying stormwater over said afterward panel and into said drainage chamber after the stormwater has passed through said containment housing; and
    a grating ramp arranged above said containment housing angled downwardly from said inlet toward said afterward panel.

2. The pollutant trap of claim 1 and further comprising a collection basket mounted aft of said grating ramp for collecting debris diverted by said grating ramp.

3. The pollutant trap of claim 1 wherein said grating ramp has an aftward likewise pitched by-pass-cover portion that functions to jettison oversize objects off said grating ramp.

4. The pollutant trap of claim 1 further comprising a plurality of laterally positioned containment housing assemblies for drainage-chambers of greater width.

5. A pollutant trap for a curb inlet type subterranean drainage chamber of a stormdrain system, comprising:
    an open-topped imperforate containment housing assembly having a forward panel, left and right side panels, an afterward panel, and a bottom tray mounted within said drainage chamber below said inlet;
    said afterward panel having spillway means for carrying stormwater over said afterward panel and into said drainage chamber after the stormwater has passed through said containment housing;
    said forward panel having an uppermost edge; fixed mounting means for locating said uppermost edge of said forward panel proximally below said inlet;
    a transverse-bulkhead member extending contiguously up from said bottom tray between said forward panel and said afterward panel and also being contiguously between said left and right side panels, thereby forming a forward sediment-chamber for isolating medium-sized debris and an aftward silt-chamber for isolating smaller sized debris; said transverse-bulkhead member having a transfer-aperture for passing stormwater therethrough; said transfer-aperture having debris grating for capturing additional debris.

6. The pollutant trap of claim 5 further comprising a replaceable hydrocarbons absorbent-unit suspended in said forward sediment-chamber.

7. The pollutant trap of claim 5 further comprising an auxiliary/silt-chamber positioned rearwardly of said afterward panel; removable TSS-filtering means positioned in said auxiliary/silt-chamber for capturing fine silt and then discharging cleansed water into said drainage chamber.

8. The pollutant trap of claim 7 wherein said TSS-filtering means comprises a tandem arrangement of a medium-grade TSS-filter staged in front of a fine-grade TSS-filter, thereby attaining further breakdown separation of pollutants prior to final discharge of cleansed water.

9. The pollutant trap of claim 8 wherein said TSS-filtering means comprises a laterally aligned pair of vertically inserted modular-cartridges; said tandem arranged TTS-filters have structural means for holding them together for convenient removal and replacement.

10. The pollutant trap of claim 5 wherein said debris grating has a plurality of spaced apart straining-teeth in combination with an awning-like aperture shroud.

11. The pollutant trap of claim 5 wherein said transverse-bulkhead member has weep-port means for aftwardly draining otherwise standing-water, thereby preventing formation of stagnant water.

12. A multi-stage pollutant trap for a curb inlet type subterranean drainage chamber of a stormdrain system comprising:
    a first stage grating ramp means angled downwardly from said inlet to divert oversize incoming objects into a collection basket located at the rear of said grating ramp;
    an open-topped imperforate containment housing assembly mounted below said grating ramp, said containment housing having a forward panel, left and right side panels, a bottom tray, an afterward panel having a spillway means for carrying stormwater over said afterward panel, and a transverse bulkhead having a transfer aperture between said forward and afterward panels;
    said housing comprising a second stage sediment chamber located between said forward panel and said transverse bulkhead for receiving stormwater passing through said grating ramp, and a third stage transverse silt chamber between said bulkhead and said afterward panel for receiving stormwater from said sediment chamber through said transfer aperture;
    a fourth stage transverse silt chamber aft of said afterward panel, said fourth stage silt chamber receiving stormwater flowing over said spillway; and
    a fifth stage filter aft of and in fluid communication with said fourth stage silt chamber for performing final filtration of suspended solids and for discharging cleaned stormwater into said drainage chamber.

13. The pollutant trap of claim 12 wherein said fifth stage filter comprises a forward filtering medium for removing fine grit and an afterward filtering medium for capturing superfine pollutants.

14. The pollutant trap of claim 12 wherein said grating ramp comprises a grating portion over said second stage and an imperforate bypass cover portion over said third, fourth and fifth stages; and wherein said collection basket is located aft of said fifth stage.

15. The pollutant trap of claim 12 and further comprising a floating hydrocarbon absorption means suspended in said second stage sediment chamber.

* * * * *